United States Patent
Diggs et al.

(10) Patent No.: US 12,530,358 B2
(45) Date of Patent: Jan. 20, 2026

(54) DATA ATTRIBUTE DEPENDENT RULES AND DATA ORCHESTRATION

(71) Applicant: Capital One Services, LLC, McLean, VA (US)

(72) Inventors: Karen L. Diggs, Henrico, VA (US); Emily Kate Gallagher, Midlothian, VA (US); Malay Udeshi, Fairfax, VA (US); David Lomelin, Vienna, VA (US); Saji Asok, Brambleton, VA (US); Owais Mohaideen, Aldie, VA (US); Jeremy Hanford, Reston, VA (US); Daniel Darrell Grey Silcox, Glen Allen, VA (US); Manish Srivastava, Glen Allen, VA (US); Christopher R. Burks, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 59 days.

(21) Appl. No.: 18/497,587

(22) Filed: Oct. 30, 2023

(65) Prior Publication Data

US 2025/0139102 A1    May 1, 2025

(51) Int. Cl.
*G06F 16/2455* (2019.01)
*G06F 16/242* (2019.01)

(52) U.S. Cl.
CPC .... *G06F 16/24564* (2019.01); *G06F 16/2428* (2019.01)

(58) Field of Classification Search
None
See application file for complete search history.

(56) References Cited

U.S. PATENT DOCUMENTS

| | | | |
|---|---|---|---|
| 2014/0177821 A1* | 6/2014 | Ristock | G06Q 10/0631 |
| | | | 379/266.08 |
| 2016/0337403 A1* | 11/2016 | Stoops | H04W 12/065 |
| 2016/0380817 A1* | 12/2016 | Agarwal | G06F 8/00 |
| | | | 709/221 |
| 2019/0244129 A1* | 8/2019 | Tabuchi | G06F 9/5033 |
| 2020/0193230 A1* | 6/2020 | Greven | G06N 20/00 |
| 2020/0327573 A1* | 10/2020 | Alapati | G06F 16/9566 |
| 2021/0200665 A1* | 7/2021 | Chikkala | G06N 5/027 |
| 2022/0129318 A1* | 4/2022 | Qiu | G06F 9/50 |
| 2024/0248975 A1* | 7/2024 | Kozlowski | G06F 21/64 |

\* cited by examiner

*Primary Examiner* — Christopher J Raab
(74) *Attorney, Agent, or Firm* — Harrity & Harrity, LLP

(57) ABSTRACT

In some implementations, a device may obtain a rule set that includes one or more rules that are defined using respective data attributes. The device may determine, based on the respective data attributes, a first level of data, including a first one or more data sources, associated with determining an outcome of the rule set. The device may determine, for at least one data source of the first one or more data sources, a second level of data associated with obtaining data from the at least one data source. The device may determine an execution protocol associated with obtaining protocol data that is associated with determining the outcome of the rule set. The device may obtain the protocol data. The device may apply, to the protocol data, the rule set to determine the outcome.

20 Claims, 11 Drawing Sheets

DATA ATTRIBUTE DEPENDENT RULES AND DATA ORCHESTRATION

BACKGROUND

Data orchestration is the process of gathering siloed data from various locations, organizing the data into a consistent, usable format, and activating the data for use by one or more data analysis tools. Data orchestration enables entities to take various fragmented data pipelines and turn the data pipelines into valuable data sources that enable improved decision-making. For example, data orchestration may include the coordination and management of multiple computer systems, applications, and/or services, and stringing together multiple tasks in order to execute a larger workflow or process.

SUMMARY

Some implementations described herein relate to a system for data attribute dependent rules and data orchestration. The system may include one or more memories and one or more processors communicatively coupled to the one or more memories. The one or more processors may be configured to obtain a rule set that includes one or more rules, wherein the rule set is associated with a protocol, and wherein the one or more rules are defined using one or more data attributes. The one or more processors may be configured to determine, based on the one or more data attributes, one or more data inputs associated with executing the protocol. The one or more processors may be configured to determine, for each data input of the one or more data inputs, one or more data sources associated with obtaining that data input, wherein the one or more data sources are based on the one or more data attributes and that data input. The one or more processors may be configured to obtain the one or more data inputs using protocol data from the one or more data sources, wherein the protocol data is obtained from a data set based on the one or more data sources. The one or more processors may be configured to execute, using the one or more data inputs, the protocol to obtain a protocol output. The one or more processors may be configured to perform an action based on the protocol output.

Some implementations described herein relate to a method for data attribute dependent rules and data orchestration. The method may include obtaining, by a device, a rule set that includes one or more rules, wherein the one or more rules are defined using respective data attributes. The method may include determining, by the device and based on the respective data attributes, a first level of data associated with determining an outcome of the rule set, wherein the first level of data is associated with a first one or more data sources. The method may include determining, by the device and for at least one data source of the first one or more data sources, a second level of data associated with obtaining data from the at least one data source, wherein the second level of data is associated with a second one or more data sources, and wherein the second one or more data sources are determined based on one or more data attributes of the at least one data source. The method may include determining, by the device, an execution protocol associated with obtaining protocol data that is associated with determining the outcome of the rule set, wherein the execution protocol is associated with an order that is based on one or more data dependencies between the first level of data and the second level of data. The method may include obtaining, by the device, the protocol data based on the execution protocol. The method may include applying, by the device and to the protocol data, the rule set to determine the outcome.

Some implementations described herein relate to a non-transitory computer-readable medium that stores a set of instructions. The set of instructions, when executed by one or more processors of a device, may cause the device to obtain a rule set that includes one or more rules, wherein the one or more rules are defined using respective data attributes. The set of instructions, when executed by one or more processors of the device, may cause the device to determine, based on the respective data attributes, a first level of data associated with determining an outcome of the rule set, wherein the first level of data is associated with a first one or more data sources. The set of instructions, when executed by one or more processors of the device, may cause the device to determine, for at least one data source of the first one or more data sources, a second level of data associated with obtaining data from the at least one data source, wherein the second level of data is associated with a second one or more data sources, and wherein the second one or more data sources are determined based on one or more data attributes of the at least one data source. The set of instructions, when executed by one or more processors of the device, may cause the device to determine an execution protocol associated with obtaining protocol data that is associated with determining the outcome of the rule set, wherein the execution protocol is associated with an order that is based on one or more data dependencies between the first level of data and the second level of data. The set of instructions, when executed by one or more processors of the device, may cause the device to generate a configuration file for the execution protocol, wherein the configuration file defines the order.

DETAILED DESCRIPTION

Figure 1A:
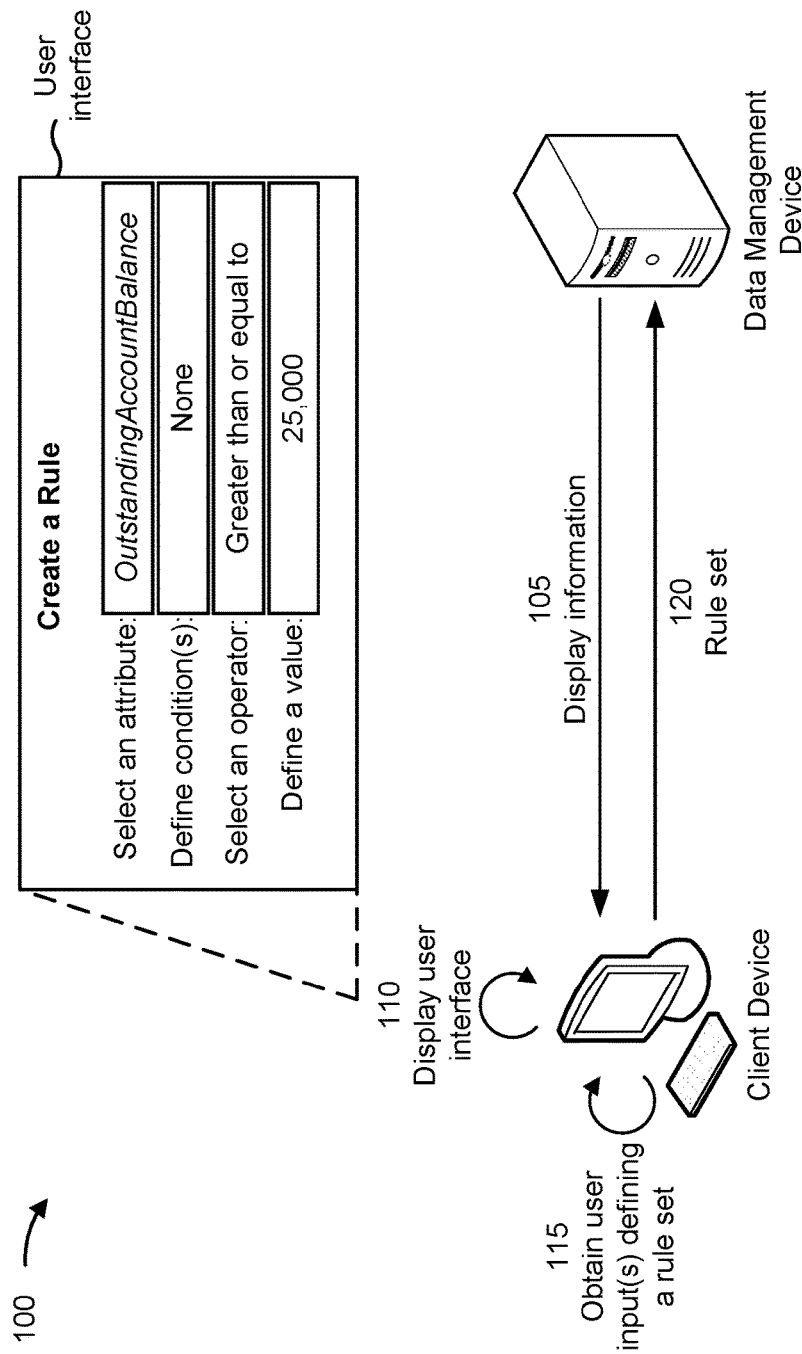
FIGS. 1A-1G are diagrams of an example associated with data attribute dependent rules and data orchestration, in accordance with some embodiments of the present disclosure.

The following detailed description of example implementations refers to the accompanying drawings. The same reference numbers in different drawings may identify the same or similar elements.

A decisioning platform may be a powerful tool that enables organizations to automate and optimize decision-making processes. The decisioning platform may bring together various components, such as an orchestrator, a rules engine, models, features, and/or data sources, among other examples, to facilitate efficient and effective decision-making. For example, an orchestrator may be a central coordinating entity of the decisioning platform. The orchestrator may enable seamless integration with data sources, rule engines, and external services, ensuring efficient decision-making. The core functionalities of the orchestrator may include workflow definition, activity coordination, decision routing, data integration, error handling, and/or recovery, among other examples. The orchestrator may facilitate scalability, performance optimization, and/or monitoring and analytics capabilities, among other examples. The rules engine may enable automated decision-making through the authoring, execution, and/or management of predefined rules. The rules engine may provide a flexible and efficient mechanism for expressing business logic, evaluating conditions against input data, and/or deriving conclusions.

In some examples, a decisioning platform may be designed for a given decision and/or business units, among other examples. For example, separate decisioning platforms may be used for different decisions and/or business units because of domain-specific requirements, data segregation needs, scalability considerations, legacy system integration, specialized technology stacks, and/or organizational structures, among other examples. For example, different domains within an entity may have unique decisioning requirements. Separate decisioning platforms may be employed to address the specific needs of each domain. For example, a customer service domain might require real-time decisioning capabilities for handling customer interactions, while a fraud detection domain may require sophisticated analytics and machine learning models. As another example, certain domains or business units within an entity may require strict data segregation and isolation. Separate decisioning platforms may allow for the isolation of data and decision-making processes, ensuring that sensitive information remains separate and protected. As another example, different decisioning platforms may employ specialized technology stacks and frameworks to cater to unique requirements. For example, one decisioning platform may utilize rule engines and business process management systems, while another decisioning platform may focus on machine learning and artificial intelligence.

While separate decisioning platforms within an entity offer some advantages, they also present one or more challenges, such as integration, data consistency, complexity, and/or operational efficiency, among other examples. For example, separate decisioning platforms may lead to data inconsistencies and redundancies. Each decisioning platform may maintain a dedicated data repository, potentially causing data duplication, synchronization issues, and discrepancies across systems. As another example, integrating and coordinating multiple decisioning platforms can introduce significant complexity. Interconnecting diverse platforms with different technologies, protocols, and interfaces requires thorough planning, standardization, and/or interoperability measures, among other examples. Integrating data flows, sharing information, and/or orchestrating decision-making across platforms may require custom integration solutions or middleware, increasing development effort and introducing potential points of failure.

As another example, maintaining and managing multiple decisioning platforms can result in a significant operational overhead, consuming processing resources, memory resources, computing resources, and/or time, among other examples. Each platform may require separate infrastructure, monitoring, maintenance, and/or support, among other examples. Ensuring consistent updates, patches, and/or security measures across all decisioning platforms may become resource intensive. Operational complexity may increase due to the management of multiple decisioning platforms, leading to higher costs, longer troubleshooting cycles, and/or potential inconsistencies, among other examples. Further, using separate decisioning platforms can lead to fragmented knowledge and skills within the entity. Each decisioning platform may require specialized expertise, leading to siloed knowledge and/or limited knowledge sharing opportunities. As another example, separate decisioning platforms may inadvertently result in overlapping decision-making processes and/or inefficiencies. Decisions that cut across multiple platforms or domains may require manual coordination or reconciliation, leading to increased complexity and potential bottlenecks. Duplication of effort, inconsistent decision outcomes, and/or lack of visibility into end-to-end decision flows, among other examples, may occur without proper synchronization mechanisms, impacting overall operational efficiency. Additionally, managing scalability and performance across multiple decisioning platforms can be complex. Resource allocation, load balancing, and/or ensuring consistent performance across multiple decisioning platforms may require careful monitoring and optimization efforts.

However, it may be difficult to design and/or manage a single decisioning platform for multiple decisions, domains, and/or business units, among other examples (e.g., because of the challenges described above). As a result, an entity may be associated with many different decisioning platforms, resulting in one or more of the problems described above. Additionally, when a new decisioning pipeline is created, a new decisioning platform may need to be designed and/or configured. For example, each component of the new decisioning platform (e.g., a rules engine, an orchestrator, data sources, models, features, and/or other components) may need to be built. As an example, locations of data repositories or data sources for the new decisioning platform may be created and/or configured. The configuration and/or creation of the new decisioning platform may require specialized knowledge, increasing the overhead and/or time associated with configuring and/or creating the new decisioning platform. Further, this may consume significant processing resources, memory resources, computing resources, and/or time, among other examples, associated with configuring and/or creating new decisioning platforms each time an entity and/or business unit develops a new product, service, and/or decision that will utilize a decisioning platform.

Some implementations described herein enable a universal decisioning platform that can be used for multiple decisions, business units, and/or services, among other examples. For example, the decisioning platform may be configurable to enable new decisions and/or workflows to be defined without configuring and/or creating new decisioning platforms and/or new components of a decisioning platform. For example, the decisioning platform may utilize data attribute dependent rules and data orchestration. In some implementations, a rule set that includes one or more rules may be defined for a protocol (e.g., a decision). The one or more rules are defined using one or more data attributes. For example, rather than defining the rules using each type of data and/or data source that will be used to make a decision based on the rule, the rule may be defined by one or more data attributes of the data that will be used to make the decision. This may reduce a complexity associated with defining the rule(s) because the rules can be defined in terms of data attributes instead of defining each type of data and/or data source (e.g., specific locations from where the data can be obtained), thereby enabling the rules to be defined without specific knowledge of how to define the type of data and/or data source locations (e.g., the specific knowledge may include coding knowledge).

The decisioning platform may include an orchestrator that determines data inputs and/or data sources using one or more data dependencies associated with the data attribute(s) used to define a rule. For example, the orchestrator may be configured to determine, based on one or more data attributes, one or more data inputs associated with executing a protocol (e.g., a decision). The one or more data inputs may be inputs that are needed to make a decision based on the rule. The orchestrator may be configured to determine, for each data input, one or more data sources associated with obtaining that data input. The one or more data sources may be based on the one or more data attributes and that data input (e.g., a data dependency associated with the one or more data attributes and/or that data input). For example, the orchestrator may be configured, for a given data input, to determine one or more secondary data inputs that are needed to determine and/or obtain the given data input (e.g., based on one or more data dependencies). This enables the orchestrator to determine a workflow for a protocol (e.g., a decision) based only on the one or more data attributes for a rule or a rule set.

The decisioning platform may be configured to obtain the one or more data inputs using protocol data from the one or more data sources (e.g., the protocol data may be obtained from a data set based on the one or more data sources). The decisioning platform may be configured to execute, using the one or more data inputs, the protocol to obtain a protocol output (e.g., the protocol output may be a decision that is based on one or more rules). The decisioning platform may be configured to perform an action based on the protocol output.

As a result, the decisioning platform may be configured to execute protocols (e.g., decisions) for different domains and/or business units. For example, by defining one or more rules (e.g., via a rules engine of the decisioning platform) using one or more data attributes, the orchestrator may be enabled to automatically determine workflows for obtaining data (e.g., using data dependencies that are based on the one or more data attributes) for rule(s) associated with different domains and/or business units. Additionally, by using the data dependencies for different data attributes, the orchestrator may be enabled to determine multiple different types of data, data sources, features, and/or models to be used to make a decision for a given rule (e.g., without the rule specifically defining the types of data, data sources, features, and/or models). This reduces a complexity associated with generating workflows for new rules and/or new protocols.

Therefore, the decisioning platform described herein may be used for making decisions for different domains and/or business units. As a result, data inconsistencies and/or redundancies that may have otherwise occurred if separate decisioning platforms were to be used may be eliminated. Additionally, the decisioning platform described herein may reduce operational complexity and/or overhead that would have otherwise occurred from the management of multiple decisioning platforms. As another example, the decisioning platform described herein may eliminate the risk of overlapping decision-making processes, inefficiencies, duplication of effort, inconsistent decision outcomes, and/or lack of visibility into end-to-end decision flows, among other examples, that would have otherwise occurred from the use of multiple decisioning platforms. Further, the decisioning platform described herein may improve scalability and performance of decision making processes by using a single decisioning platform for different decisions, domains, and/or business units. Moreover, the decisioning platform described herein may reduce a complexity and/or time and conserve processing resources, computing resources, and/or memory resources that would have otherwise been associated with creating, configuring, and/or managing multiple decisioning platforms for different decisions, domains, and/or business units.

FIGS. 1A-1G are diagrams of an example 100 associated with data attribute dependent rules and data orchestration. As shown in FIGS. 1A-1G, example 100 includes a data management device, a client device, and one or more data sources. These devices are described in more detail in connection with FIGS. 3 and 4. In some implementations, the data management device may include (or may be a device included in) a decisioning platform. The decisioning platform is described in more detail in connection with FIG. 2.

As shown in FIG. 1A, a user interface may be used to define one or more rules for a protocol. As described herein, a "protocol" may refer to one or more steps associated with making a decision. For example, a protocol may be associated with a decision that is to be made by the data management device and/or the decisioning platform. The user interface may enable a rule to be defined in terms of one or more data attributes, as described in more detail elsewhere herein.

A data attribute may be a descriptor for a data point or a data object. For example, a data attribute may describe other data. A data attribute may be a single value descriptor for a data point or a data object. In some implementations, a data attribute may be associated with using one part of data to describe other parts of the data. A data attribute may be a date (e.g., a given year, month, and/or date), text (e.g., a string of a combination of letters, numbers, and/or other symbols), and/or a Boolean expression (e.g., for binary data), among other examples. In some implementations, a data attribute may be a data field that represents a characteristic or feature of a data object. For example, for customer data, an attribute may include a customer identifier, an address, and/or a phone number, among other examples. In some implementations, a data attribute may be a data attribute defined for a programming language associated with a database or a data repository. As an example, a data attribute may be defined using a syntax or format associated with a programming language used to obtain, manipulate, create, and/or delete data in a data repository associated with the decisioning platform.

As shown by reference number 105, the data management device may transmit, and the client device may receive, display information. The display information may be associated with a user interface (e.g., a graphical user interface (GUI)). For example, the display information may enable the client device to display the user interface. The user interface may be associated with a rules engine of the decisioning platform. For example, the user interface may enable one or more rules (or a rule set) to be defined via the client device.

As shown by reference number 110, the client device may display the user interface. For example, the client device may obtain an input indicating the initiation of a rule creation. For example, a user may interact with the client device to create a new rule and/or a new rule set. The rule(s) and/or rule set may be associated with a protocol (e.g., one or more steps associated with making a decision). For example, a rule may define conditions and/or values for one or more data attributes that define how a decision is to be made (or define what a result of a decision should be).

The user interface may enable rules to be defined using one or more data attributes. For example, as shown in FIG. 1A, the user interface may include one or more fields (e.g., one or more user input options) associated with inputting or selecting one or more data attributes. For example, the one or more user input options may enable one or more data attributes to be defined for a rule. In some implementations, the client device may obtain and/or store a set of data attributes. In some implementations, the set of data attributes may be indicated via the display information. The set of data attributes may be selectable via one or more fields of the user interface.

In some implementations, one or more data attributes that are available to be selected via the user interface may be based on one or more security parameters. For example, the one or more security parameters may be associated with a user identifier. As an example, the user identifier may be associated with one or more security permissions (e.g., a security permission may be a security parameter). A security permission may indicate one or more data sets or databases that a given user has access to (e.g., one or more data sets or databases that a given user is permitted to create rule(s) for). The client device may obtain the user identifier (e.g., via a log in to a platform associated with the rules engine). The client device may determine, based on the user identifier, one or more data sets and/or one or more databases that are permitted to be accessed. The client device may determine one or more (e.g., a set of) data attributes associated with the one or more data sets and/or one or more databases. For example, the one or more data attributes may be data attributes that describe one or more data objects included in the one or more data sets and/or one or more databases. The client device may cause the one or more data attributes to be selectable via the user interface. In this way, security and/or privacy associated with data may be improved because only permitted users may create rule(s) for certain data.

As shown in FIG. 1A, the user interface may include a field associated with selecting a data attribute (e.g., "Select an attribute"), a field associated with defining one or more conditions (e.g., conditions associated with applying or executing the rule), a field associated with defining an operator for the rule (e.g., "Select an operator"), and/or a field associated with defining a value for the rule (e.g., "Define a value"), among other examples. The one or more fields of the user interface may enable a rule to be defined in terms of one or more data attributes.

For example, as shown in FIG. 1A, the data attribute may be an outstanding account balance (e.g., "OutstandingAccountBalance" as shown in FIG. 1A), there may be no conditions associated with applying the rule, the operator may be "greater than or equal to", and the value may be 25,000. In such examples, the rule may define that outstanding account balances that are greater than or equal to 25,000 (e.g., $25,000) should be returned when the rule is applied. As another example, a data attribute may include an account type, an age of an oldest trade, an annual gross income, and/or an annual housing payment, among other examples.

As shown by reference number 115, the client device may obtain one or more user inputs defining a rule set (e.g., one or more rules). For example, the one or more user inputs may define one or more data attributes, one or more conditions, one or more operators, and/or one or more values for respective rules included in the rule set. As described elsewhere herein, the one or more data attributes may define one or more types of data to be used to execute a protocol. For example, the rule set may be associated with a protocol (e.g., a decision to be made).

As shown by reference number 120, the client device may transmit, and the data management device may receive, the rule set. For example, the data management device may obtain a rule set that includes one or more rules (e.g., where the rule set is associated with a protocol and the one or more rules are defined using one or more data attributes). In some implementations, the data management device may obtain an indication of one or more rules that are defined using respective data attributes.

For example, a rules engine of the data management device (and/or the decisioning platform) may obtain the rule set via the client device. In some implementations, the rules engine may provide, and an orchestrator of the data management device (and/or the decisioning platform) may obtain, an indication of the rule set. In some implementations, the rules engine may provide, and the orchestrator may obtain, an indication of the one or more data attributes associated with the rule set. For example, the rules engine may obtain the one or more rules and indicate to the orchestrator the data attribute(s) of data that are needed to apply and/or execute the one or more rules.

Figure 1B:
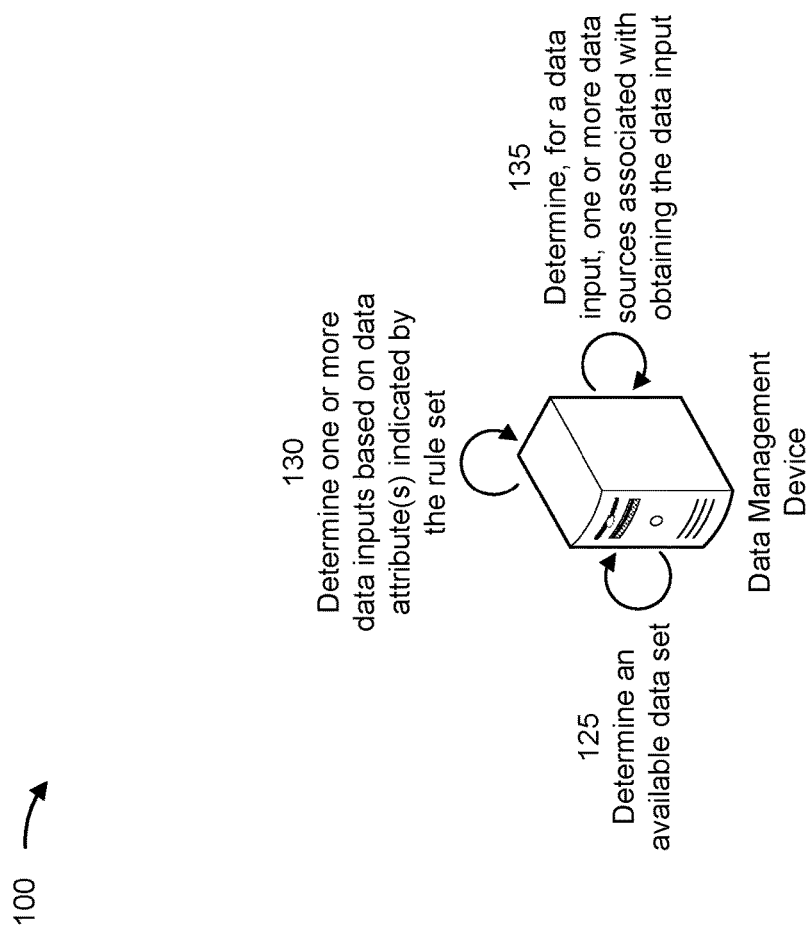

As shown in FIG. 1B, and by reference number 125, the data management device may determine one or more available data sets (and/or data repositories) associated with the rule set. For example, the data management device may determine the one or more available data sets (and/or data repositories) based on one or more security parameters. For example, the one or more security parameters may be associated with the user identifier. As an example, the user identifier may be associated with the one or more security permissions (e.g., a security permission may be a security parameter). A security permission may indicate one or more data sets or databases that a given user has access to (e.g., one or more data sets or databases that a given user is permitted to create rule(s) for). The data management device may obtain the user identifier (e.g., via the information associated with the rule set from the client device). The data management device may determine, based on the user identifier and/or the one or more security parameters, one or more data sets and/or one or more databases that are permitted to be accessed.

As shown by reference number 130, the data management device may determine one or more data inputs based on the one or more data attributes indicated by the rule set. As used herein, a "data input" may refer to data that is directly input or used to determine an outcome of one or more rules. For example, a data input may be data that is described by a data attribute indicated by the rule. As another example, a data input may be data that is directly used to obtain or generate data that is described by a data attribute. The one or more data inputs may be associated with (and/or included in) a first level of data associated with determining an outcome of the rule set. The first level of data may include data that is directly used to determine the outcome of the rule set. Different levels of data for a data attribute and/or a rule are depicted and described in more detail in connection with FIG. 1C. A data input may include data, an output of a model (e.g., a machine learning model), and/or an output of a feature (e.g., an analytics feature, an attribute, and/or a variable), among other examples.

The data management device may determine the one or more data inputs based on one or more data dependencies. The data management device may determine, based on the one or more data attributes, one or more data inputs associated with executing the protocol (e.g., associated with determining an outcome of the rule set). For example, a given data attribute may be associated with one or more data dependencies. A data dependency may indicate data that is needed to determine, generate, and/or obtain other data. For example, a data dependency for a data attribute indicated by a rule may indicate a data input associated with determining an outcome of the rule and/or with determining, generating, and/or obtaining data described by the data attribute.

In some implementations, the data management device may store an indication of one or more data dependencies for respective data attributes. For example, the data management device may obtain a set of data attributes associated with one or more data sets and/or one or more data repositories (e.g., the one or more data sets and/or one or more data repositories determined as described in connection with reference number 125). The data management device may search a data dependency database based on the one or more data sets and/or one or more data repositories and the one or more data attributes indicated by the rule set. For example, the data dependency database may include indications of data attributes and corresponding data dependencies. The data management device may determine the one or more data dependencies for respective data attributes indicated by the rule set based on searching the data dependency database.

In some implementations, the data dependency database may be a library or dictionary of data sources. The library or dictionary may indicate how, for a given data source, the data is to be collected, generated, and/or formatted. In other words, the library or dictionary may indicate, for a given data source or a given data attribute, one or more data dependencies (e.g., indicating other data sources that are to be used to determine, generate, and/or obtain data from the given data source). The data dependency database may be an enterprise level database. In other words, the data dependency database may include information for data sources and/or data attributes for an entire entity. This may enable the data management device to quickly identify (e.g., in a low latency manner) the data inputs and/or data sources needed to obtain data for a given data attribute and/or a given rule.

As shown by reference number 135, the data management device may determine, for a data input, one or more data sources associated with obtaining the data input. In some implementations, the data management device may determine, for each data input of the one or more data inputs, one or more data sources associated with obtaining that data input. In some implementations, the one or more data sources are based on the one or more data attributes and that data input. For example, a "data source" may be a location where data that is needed to determine, generate, and/or obtain a data input is located and/or stored. A data source may indicate data that is used to determine, generate, and/or obtain a data input. A data source may be associated with a second level of data. For example, the second level of data may include data that is used to determine, generate, and/or obtain data included in the first level of data (e.g., but that is not directly used to determine an outcome of the rule set).

The data management device may determine, for a given data input, one or more data sources associated with the given data input based on one or more data dependencies associated with the given data input. For example, in a similar manner as described above, the data management device may store associations between data inputs and one or more data sources. For example, a data dependency for a data input may indicate one or more data sources that are used to determine, generate, and/or obtain the data input. For example, a data source may include data that is used (e.g., by a device associated with a data input) to obtain the data input. A data source may be associated with data, an output of a model (e.g., a machine learning model), and/or an output of a feature (e.g., an analytics feature, an attribute, and/or a variable), among other examples. In some implementations, a data input or a first level data source may be a data source that is directly used to determine an outcome of a rule set. A secondary data source or a second level data source may be a data source that is used to determine, generate, and/or obtain a data input or a first level data source.

In some implementations, the one or more data sources may include at least one dependent data source that uses another data source, from the one or more data sources, to obtain data. For example, the data management device may determine, for a data source (e.g., a second level data source), one or more data sources associated with the data source (e.g., a second level data source) based on one or more data dependencies associated with the data source (e.g., a second level data source). For example, the data management device may determine one or more third level data sources, in a similar manner as described above. The data management device may continue to determine one or more levels of data sources for the data attribute(s) until no data sources are dependent on other data sources. In other words, the data management device may continue to determine data sources associated with obtaining data for a data attribute until all data sources in a last level are independent data sources. An independent data source may be a data source from which data can be obtained without providing or using data from another data source.

For example, the data management device may determine, for a data input of the one or more data inputs, a first data source of the one or more data sources based on a first data attribute associated with the data input. The first data source is associated with obtaining the data input. For example, the first data source may be a data source that provides data that is used to determine, generate, and/or obtain data from a data source of the data input. The data management device may determine, for the first data source, a second data source of the one or more data sources based on a second data attribute associated with the first data source. The second data source may be associated with obtaining data for the first data source. For example, the second data source may be a data source that provides data that is used to determine, generate, and/or obtain data from the first data source. Protocol data (e.g., data used to execute the protocol and/or used to determine an outcome of a rule set associated with the protocol) may include data from the data input, the first data source, and/or from the second data source. The data input may be included in a first level of data associated with the protocol data. The first data source may be included in a second level of data associated with the protocol data. The second data source may be included in a third level of data associated with the protocol data.

As an example, a data input for a given data attribute may be an average credit score. The average credit score may be used as an input to determine an outcome of a rule that is defined using a data attribute. The average credit score may be included in a first level of data associated with the rule. The data management device may determine that, to determine the average credit score, a first credit score from a first credit bureau, a second credit score from a second credit bureau, and a third credit score from a third credit bureau are needed. The first credit score, the second credit score, and the third credit score may each be a data source for the data input of the average credit score. The first credit score, the second credit score, and the third credit score may be included in a second level of data associated with the rule. The data management device may determine that, to determine the first credit score, information associated with a user and/or an entity is needed (e.g., the information may be provided to the first credit bureau and the first credit bureau may provide the first credit score for the user and/or the entity). The information may include a name, a date of birth, a social security number, and/or an address, among other examples.

In other words, the data management device may determine (e.g., based on a data dependency associated with the data source of the first credit bureau) that the data management device will be unable to obtain the first credit score from the first credit bureau (e.g., where a device associated with the first credit bureau is a data source and the data provided by the data source is the first credit score) without providing the first credit bureau the information associated with the user and/or the entity. Therefore, the first credit score from the first credit bureau may be a dependent data source (e.g., that is dependent on data from other data sources). The data sources associated with the information may be included in a third level of data associated with the rule. The data management device may determine that the information associated with the user and/or the entity are independent data sources because the data management device may be capable of obtaining the information associated with the user and/or the entity without using or needing additional data (e.g., the data management device may obtain the information without needing or using other data from another data source to obtain the information).

Figure 1C:
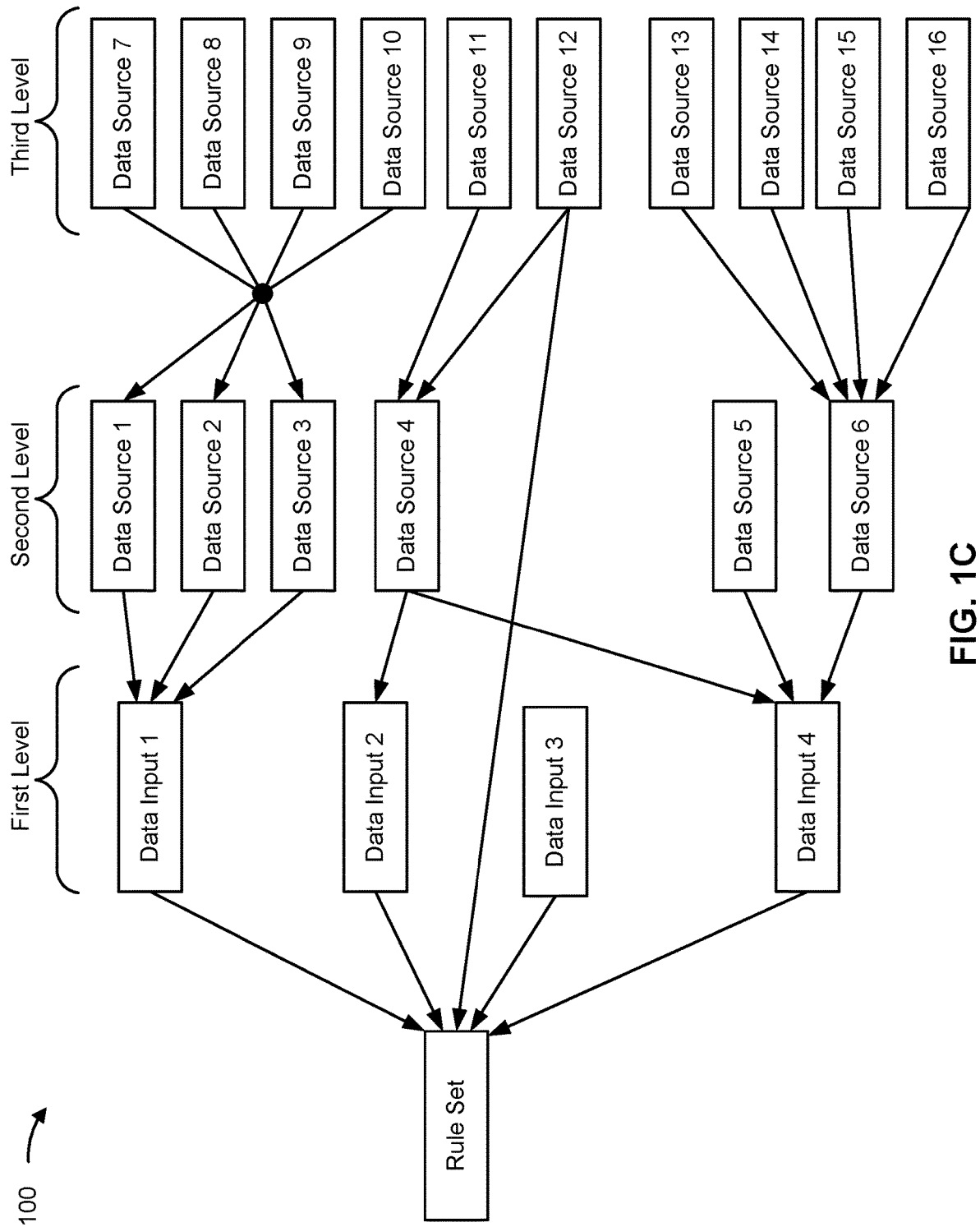

FIG. 1C depicts different levels of data associated with a rule set (e.g., one or more rules). For example, the data management device may determine the data input(s) and/or data source(s) for the rule set based on one or more data attributes associated with the rule set. For example, as shown in FIG. 1C, the data management device may determine different levels of data for obtaining data input(s) associated with determining, generating, and/or obtaining data described by one or more data attributes (e.g., based on one or more data dependencies, as described elsewhere herein).

For example, the rule set may indicate one or more data attributes. The data management device may determine, based on the one or more data attributes, that a first data input (e.g., data input 1), a second data input (e.g., data input 2), a third data input (e.g., data input 3), and a fourth data input (e.g., data input 4) are needed to determine, obtain, and/or generate data described by the one or more data attributes. For example, the first data input, the second data input, the third data input, and the fourth data input may be included in a first level of data associated with the rule set.

In some implementations, the data management device may determine that, for at least one data input in the first level of data, one or more other data sources are to be used to obtain, generate, and/or determine data from the at least one data input (e.g., based on one or more data dependencies associated with the at least one data input). For example, as shown in FIG. 1C, the first data input (e.g., data input 1) may use data from a first data source (e.g., data source 1), a second data source (e.g., data source 2), and a third data source (e.g., data source 3) to obtain, generate, and/or determine data from the first data input. Similarly, the data management device may determine that a fourth data source (e.g., data source 4) may be used to obtain, generate, and/or determine data from the second data input and the fourth data input. Similarly, the data management device may determine that a fifth data source (e.g., data source 5) and a sixth data source (e.g., data source 6) are to be used to obtain, generate, and/or determine data from the fourth data input.

In some implementations, as shown in FIG. 1C, a data input (e.g., a data source included in the first level of data) may be an independent data source or an independent data input. For example, the third data input (e.g., data input 3) may be obtained without using data from any other data source. In other words, the data management device may determine that data may be obtained from a data source associated with the third data input without first obtaining data from another data source. As an example, the third data input may be a random number or data that can be directly obtained from a database or a data repository. The dependent data inputs (e.g., the first data input, the second data input, and the fourth data input) may use data from other data sources. For example, the first data input may be associated with a data source for which the data management device is to provide data from the first data source, the second data source, and the third data source in order to obtain the first data input from the data source. As another example, the fourth data input may be an output of a machine learning model that uses data from the fourth data source, the fifth data source, and the sixth data source as inputs to the machine learning model.

As shown in FIG. 1C, the data management device may determine that, for at least one data source included in the second level of data, one or more other data sources are to be used to obtain, generate, and/or determine data from the at least one data source included in the second level of data. For example, the fifth data source may be an independent data source. However, all other data sources included in the second level of data may be dependent data sources that use data from other data sources, as shown in FIG. 1C. Therefore, the data management device may determine one or more data sources (e.g., data source 7 through 16 as shown in FIG. 1C) included in a third level of data. As shown in FIG. 1C, the data management device may determine that the third level of data is a last level of data for the rule set because all data sources included in the third level of data are independent data sources.

In some implementations, a data source included in a level other than the first level may also be a data input for the rule set. For example, the data management device may determine that the data source 12 is included in the third level of data because the data source 12 provides data that is used to obtain data from the data source 4. Additionally, the data management device may determine that data from the data source 12 is to be directly used to determine an outcome of the rule set.

Three levels of data are shown in FIG. 1C as an example. In other examples, the data management device may determine that a rule set is associated with more levels, fewer levels, more data inputs, fewer data inputs, more data sources, and/or fewer data sources based on the one or more attributes indicated by the rule set. The data management device may use the connections between data sources in different levels to determine a flow (e.g., a workflow or a protocol flow) for the rule set, as described in more detail elsewhere herein.

Figure 1D:
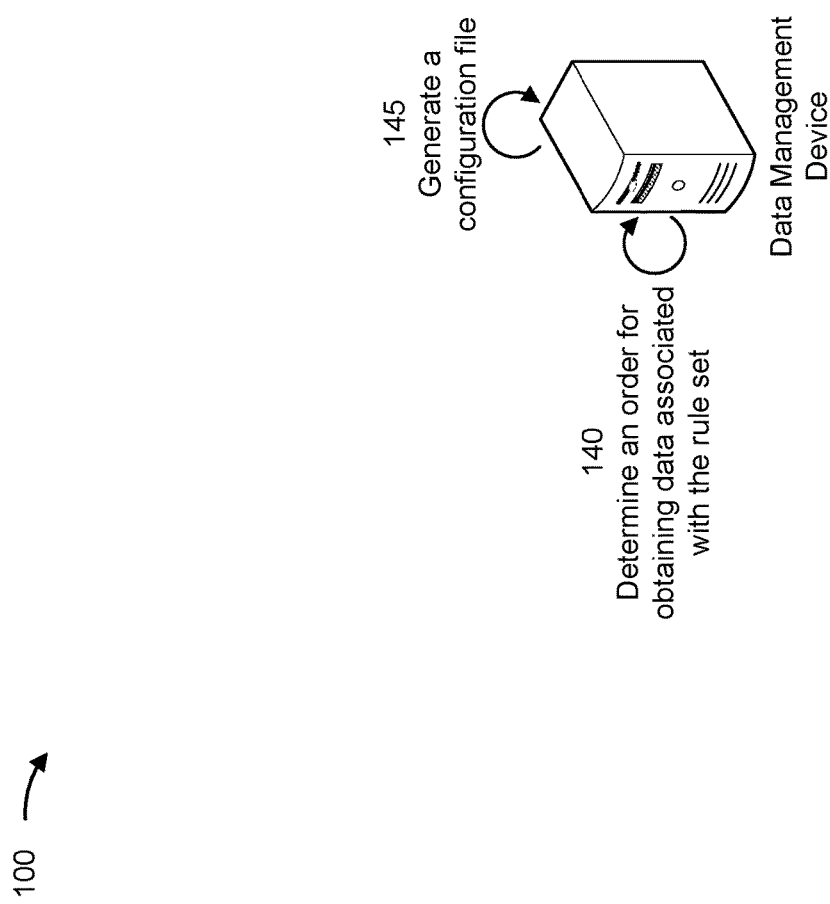

As shown in FIG. 1D, and by reference number 140, the data management device (e.g., and/or an orchestrator of the decisioning platform) may determine an order for obtaining data (e.g., protocol data) associated with the rule set. The order may be associated with a flow (e.g., a workflow or a protocol flow) for the rule set. In some implementations, the flow may be referred to as an execution protocol.

For example, the data management device may determine an execution protocol associated with obtaining protocol data that is associated with determining the outcome of the rule set. The execution protocol may be associated with an order that is based on one or more data dependencies between one or more levels of data associated with the rule set. For example, the execution protocol may define one or more steps for obtaining data from one or more data sources in the one or more levels of data associated with the rule set.

For example, the data management device may determine, for a first data source, a second data source based on a data attribute associated with the first data source indicating a data dependency with the second data source (e.g., the first data source may be the data source 1 and the second data source may be the data source 7 depicted in FIG. 1C). In other words, the second data source may be associated with first data that is used to obtain second data from the first data source. The data management device may determine that, based on the data dependency and in the execution protocol, the first data (e.g., from the data source 7) is to be obtained before obtaining the second data (e.g., from the data source 1).

For example, the data management device may determine, for a step associated with obtaining a data input, a data dependency between two or more data sources based on one or more data attributes and the data input. The data dependency may indicate that a first data source, from the two or more data sources, relies on data from a second data source of the two or more data sources. The data management device may determine at least one step of the one or more steps (e.g., of the execution protocol and/or the protocol flow) based on the data dependency to cause data to be obtained from the second data source before data is obtained from the first data source.

In other words, the data management device may determine or generate a directed graph for data sources and/or data inputs based on the one or more data attributes indicated by the rule set and based on one or more data dependencies, as described in more detail elsewhere herein. The data management device may determine an order of steps for the execution protocol and/or the protocol flow based on the directed graph. For example, the data management device may generate the directed graph based on the one or more data attributes indicated by the rule set (e.g., in a similar manner as described elsewhere herein). The data management device may analyze the relationships and dependencies indicated by the directed graph to determine the order and/or flow for obtaining data associated with the rule set. As an example, the data sources and/or data inputs depicted in FIG. 1C may be nodes and the arrows may be edges. The data management device (e.g., the orchestrator) may analyze the relationships between the nodes and the edges to determine an optimal workflow or order of steps associated with obtaining data (e.g., protocol data) for determining an outcome of the rule set. For example, the order of steps may be associated with minimizing an amount of time associated with obtaining the data (e.g., protocol data) for determining the outcome of the rule set.

In some implementations, as shown by reference number 145, the data management device (e.g., the orchestrator) may generate a configuration file for the protocol (e.g., for the rule set). The configuration file may be a file that is executed to cause the data management device (or another device) to obtain the data (e.g., the protocol data) to be used to determine the outcome of the rule set. For example, the configuration file may define one or more steps for obtaining data from the one or more data sources and for determining the one or more data inputs to be used to determine the output of the rule set.

Figure 1E:
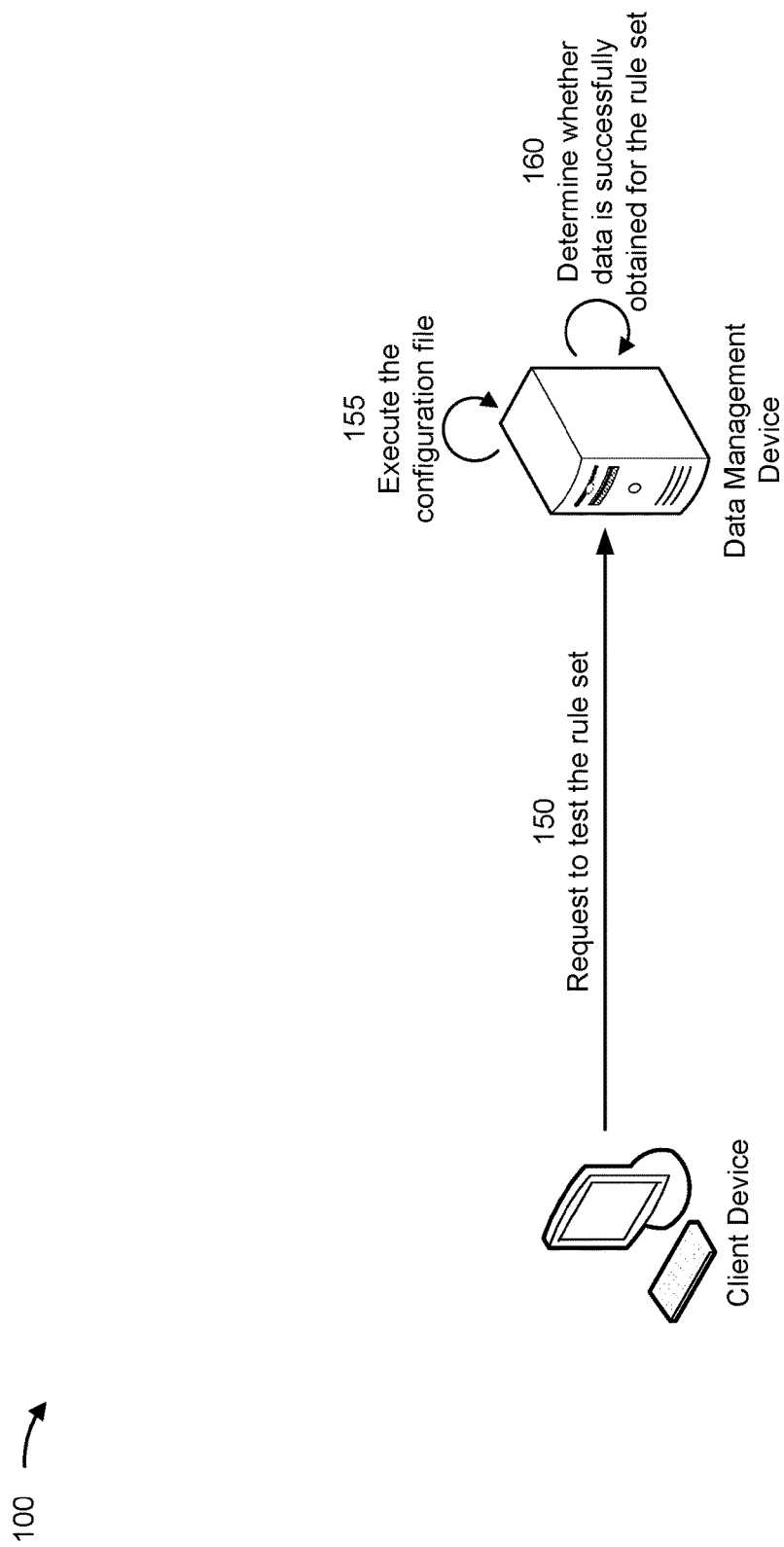

As shown in FIG. 1E, and by reference number 150, the client device may transmit, and the data management device may obtain, a request to test a created rule set. For example, the rule set and/or configuration file generated for a rule set may be tested by the data management device. In some implementations, the client device may obtain a user input to test the rule set (e.g., via the user interface depicted and described in connection with FIG. 1A).

As shown by reference number 155, the data management device may execute the configuration file in response to obtaining the request to test the rule associated with the rule set. In some implementations, the data management device may execute the configuration file in connection with synthetic data. For example, the request to test the rule set may indicate synthetic data for the rule set (e.g., created data). In other implementations, the data management device may generate the synthetic data. The data management device may use the synthetic data to obtain the protocol data in accordance with the execution protocol (e.g., in accordance with the order of steps indicated by the execution protocol).

As shown by reference number 160, the data management device may determine whether data is successfully obtained for the rule set. For example, the data management device may determine whether the data management device was able to communicate and/or obtain data from each data source associated with the rule set. If the data management device determines that the data management device was unable to obtain data from at least one data source and/or for at least one data input, then the data management device may determine that the execution protocol for the rule set was not properly generated.

Additionally, or alternatively, the data management device may determine an outcome of the rule set based on the obtained data. For example, the data management device may obtain the protocol data based on executing the configuration file. The data management device may determine an outcome of the rule set based on the protocol data. The data management device may transmit, and the client device may receive, an indication of the outcome. This may enable the client device and/or a user to determine if the outcome of the rule matches an expected outcome. In other words, this enables a user who created the rule set to test that the rule set is functioning as expected.

The operations described in connection with FIGS. 1A-1E may be associated with a "building" stage or a "generation" stage of developing a protocol associated with a decision for the decisioning platform. For example, one or more operations described above may be used to generate a flow for determining an outcome for a rule set based on one or more attributes used to define rule(s) included in the rule set. The operations described in connection with FIGS. 1F and 1G may be associated with an "execution" stage for determining outcomes of the rule set based on the information generated and/or developed during the building stage or the generation stage.

Figure 1F:
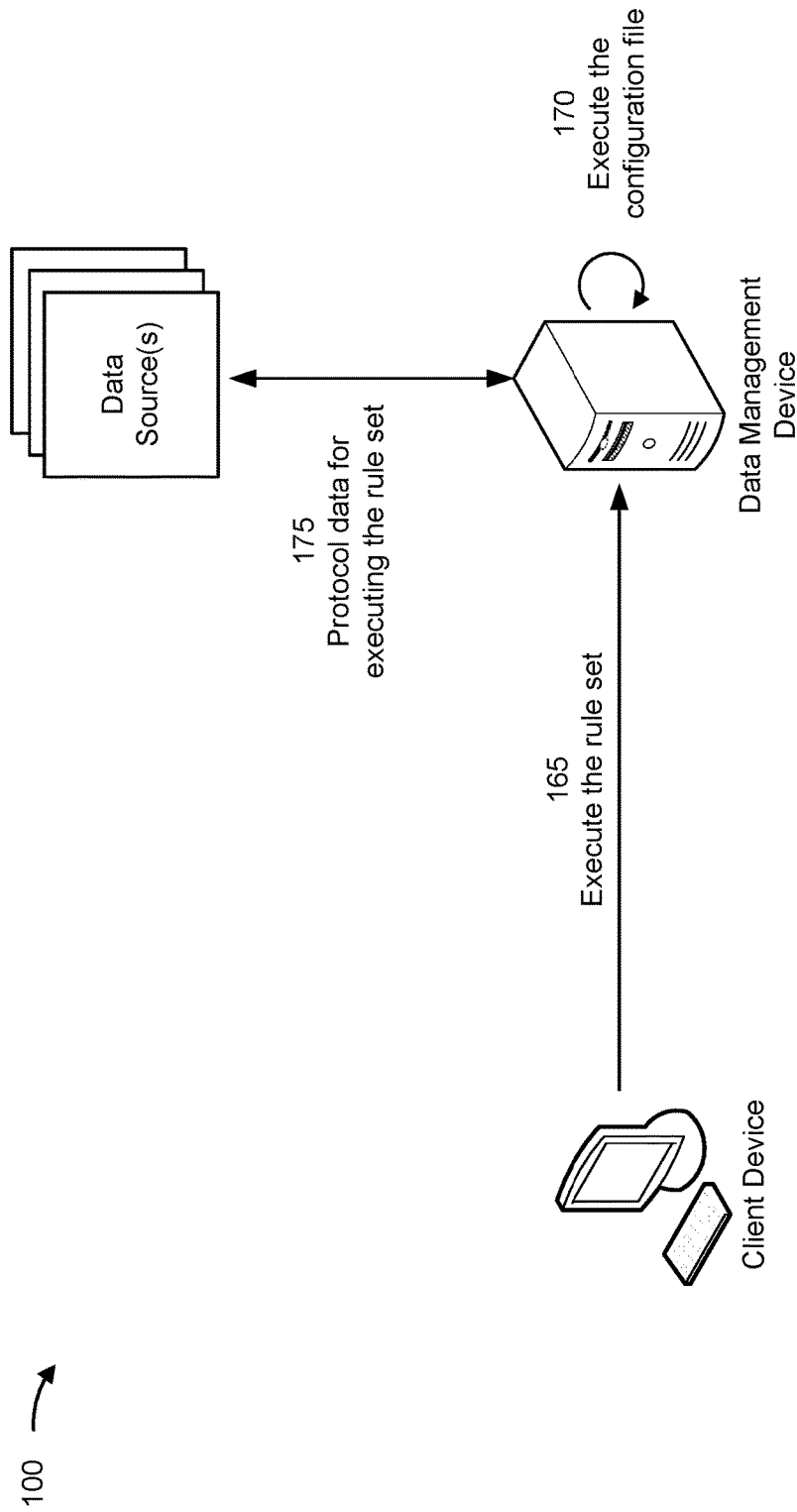

As shown in FIG. 1F, and by reference number 165, the client device may transmit, and the data management device may receive, an indication to execute the rule set. For example, the data management device may obtain an application programming interface (API) call. Additionally, or alternatively, the data management device may determine that the rule set is to be executed. For example, the data management device may determine that the rule set is to be executed based on receiving the indication (e.g., from the client device and/or via an API call). Additionally, or alternatively, the data management device may determine that the rule set is to be executed based on detecting an event. The event may be defined by one or more conditions associated with the rule set. For example, the one or more conditions may indicate conditions for executing the rule set. If the data management device detects the event, then the data management device may determine that the rule set is to be executed.

In some implementations, the indication to execute the rule set may indicate rule data. The rule data may be used by the data management device to obtain the protocol data. For example, the rule data may indicate a user, an account, or an entity. The data management device may obtain protocol data that is associated with the user, the account, or the entity (e.g., as described in more detail elsewhere herein).

As shown by reference number 170, the data management device may execute the configuration file. Executing the configuration file may cause the data management device to perform one or more actions to obtain the protocol data associated with the rule set. For example, the orchestrator of the decisioning platform may perform the one or more steps (e.g., in the order) indicated by the execution protocol (e.g., that is determined by the data management device as described in more detail elsewhere herein). For example, as shown by reference number 175, the data management device may communicate with one or more data sources to obtain the protocol data.

As an example, the data management device may communicate with a first data source to obtain first data (e.g., based on the rule data indicated by the indication to execute the rule set). The data management device may provide the first data to a second data source. In response to providing the first data, the data management device may obtain, from the second data source, second data. The second data may be used to determine the outcome of the rule set and/or may be used to obtain additional data, as described in more detail elsewhere herein.

Figure 1G:
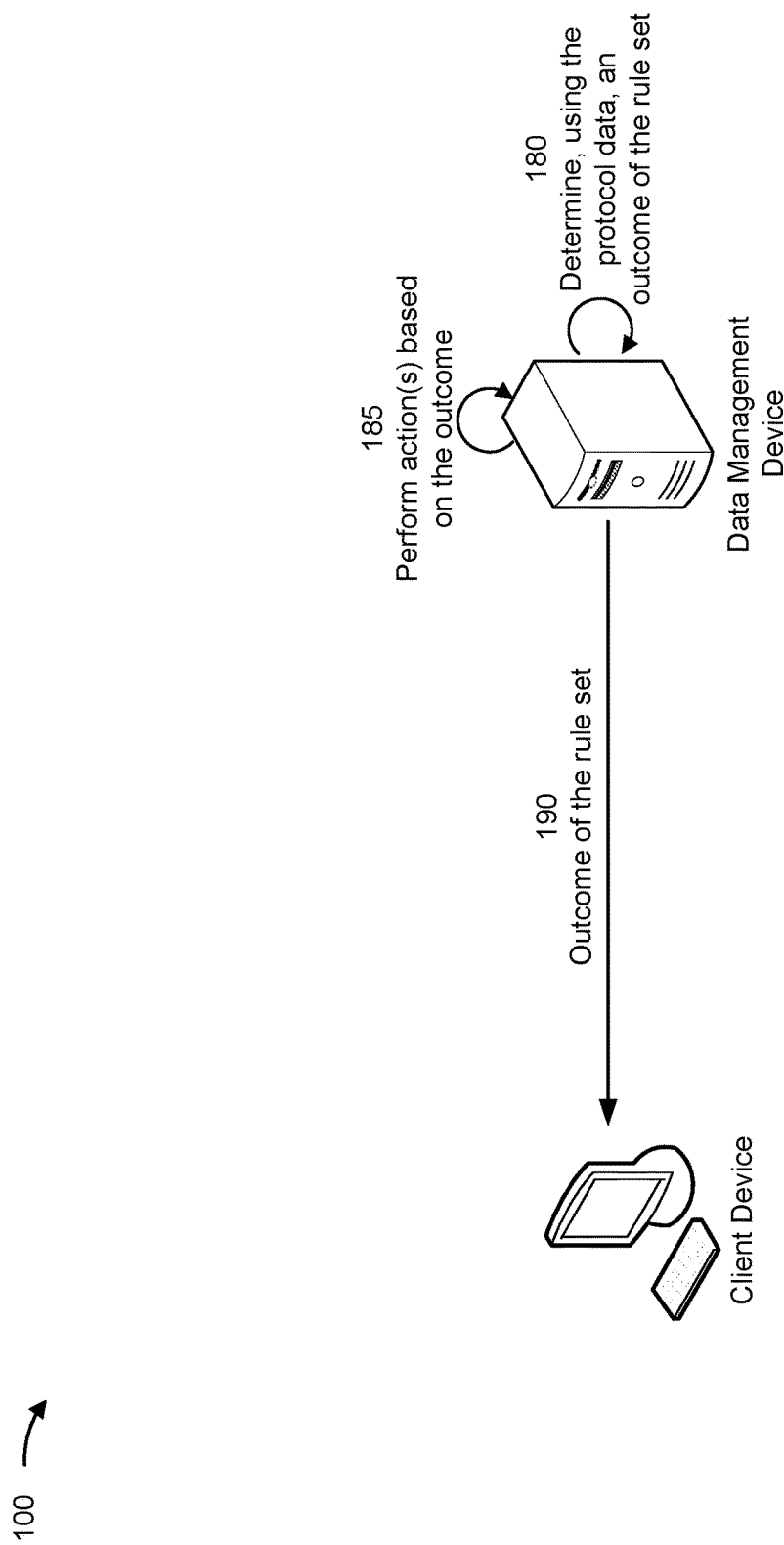

As shown in FIG. 1G, and by reference number 180, the data management device may determine, using the protocol data, an outcome of the rule set. The outcome of the rule set may also be referred to herein as a protocol output. For example, the data management device may apply one or more rules, conditions, operators, and/or values indicated by the rule set to determine the outcome. In some implementations, the outcome may include a set of data. For example, a rule may be associated with returning data that satisfies one or more conditions. As another example, the outcome may be a binary outcome (e.g., a "yes or no" outcome or a "pass or fail" outcome). For example, the rule may be associated with determining whether a given account meets the conditions for a service or promotion.

As shown by reference number 185, the data management device may perform one or more actions based on the outcome of the rule set. For example, the data management device may perform one or more fulfillment actions. For example, the decisioning platform may include a fulfillment orchestrator and/or one or more fulfillment systems. The orchestrator may provide an indication of the outcome to enable the fulfillment orchestrator and/or one or more fulfillment systems to perform one or more actions that are based on the outcome. In some implementations, the data management device may perform an action that is indicated by the outcome of the rule set.

As an example, the outcome may indicate a determination for a request associated with an account. The data management device may perform a modification of information associated with the account if the determination indicates that the request is approved. If the determination indicates that the request is denied, then the data management device may cause a communication to be transmitted to a device associated with the account indicating that the request is denied. In some implementations, the action may include transmitting, to devices associated with one or more users or one or more accounts indicated by the outcome, a communication. For example, the communication may be an offer or promotion (e.g., for a service offered by an entity).

In some implementations, as shown by reference number 190, the data management device may provide, and the client device may obtain, an indication of the outcome of the rule set. For example, the data management device may indicate the outcome of the rule set to the device (e.g., the client device) that requested that the rule set be executed.

As indicated above, FIGS. 1A-1G are provided as an example. Other examples may differ from what is described with regard to FIGS. 1A-1G.

Figure 2:
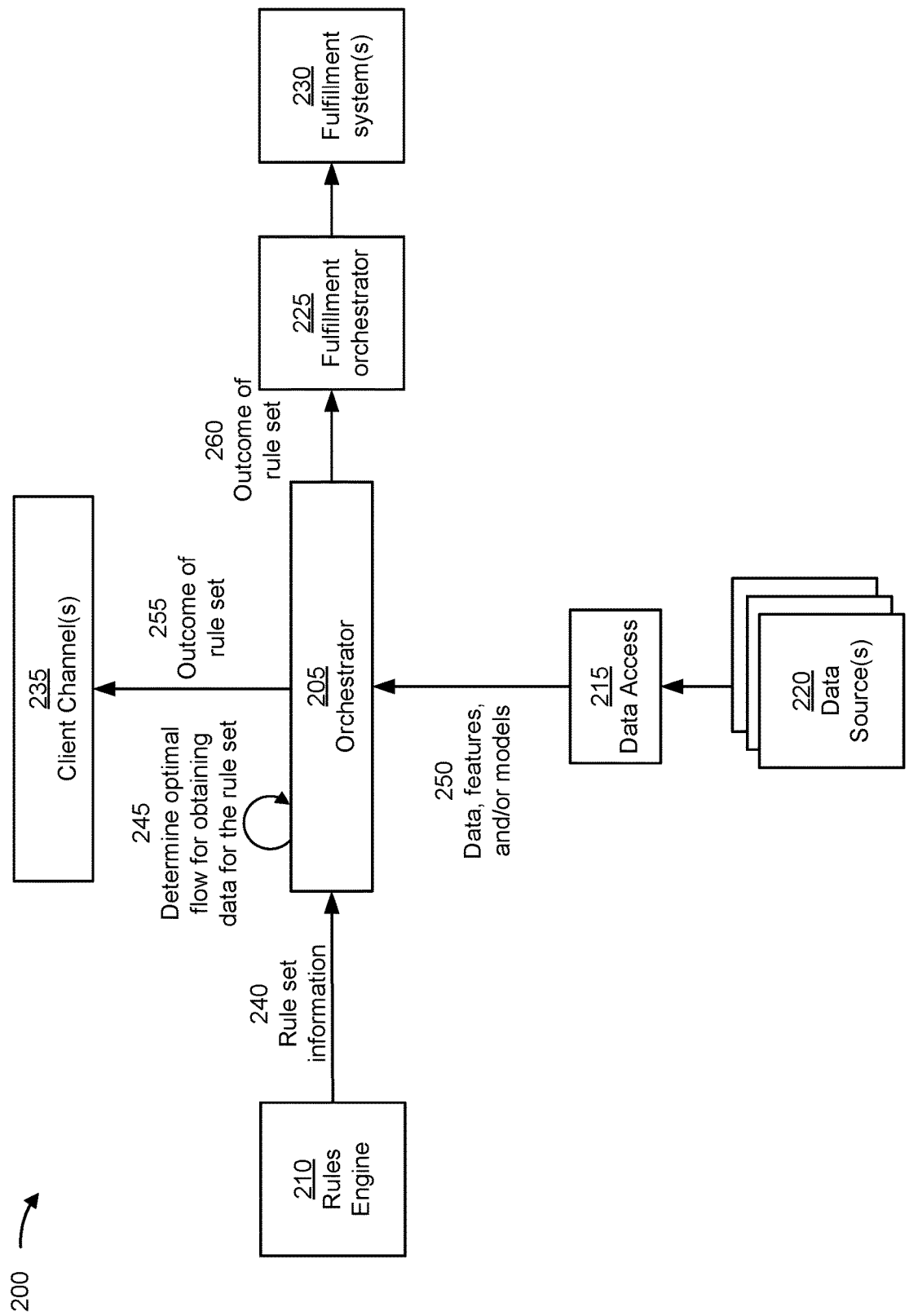
FIG. 2 is a diagram of an example decisioning platform associated with data attribute dependent rules and data orchestration, in accordance with some embodiments of the present disclosure.

FIG. 2 is a diagram of an example decisioning platform 200 associated with data attribute dependent rules and data orchestration. As shown in FIG. 2, the decisioning platform 200 includes an orchestrator 205, a rules engine 210, a data access layer 215, one or more data sources 220, a fulfillment orchestrator 225, one or more fulfillment systems 230, and/or one or more client channels 235. In some implementations, the decisioning platform 200 may be, or may be included in, the data management device described elsewhere herein. In some implementations, the data management device described elsewhere herein may be included in the decisioning platform 200. The decisioning platform 200 may be configured to perform one or more (or all) of the operations described in connection with FIGS. 1A-1G.

In some implementations, the orchestrator 205 may include one or more orchestrators. For example, the decisioning platform 200 may include a primary orchestrator associated with controlling or managing operations associated with all components of the decisioning platform 200. Additionally, the decisioning platform 200 may include a rules orchestrator associated with controlling or managing operations associated with obtaining data, features, and/or models to be used to determine the outcome of a rule set and/or determining the outcome of the rule set.

As shown by reference number 240, the rules engine 210 may provide, and the orchestrator 205 may obtain, rule set information. As described in more detail elsewhere herein, the rule set information may indicate one or more data attributes associated with a rule set. The one or more data attributes may describe data that is accessible via the data access layer 215.

As shown by reference number 245, the orchestrator 205 may determine an optimal flow for obtaining data for the rule set. For example, based on the one or more data attributes, the orchestrator may use one or more data dependencies to determine one or more data inputs and/or one or more data sources from which data is to be obtained to obtain data described by the one or more data attributes. The orchestrator may determine an order of steps to be performed (e.g., the steps may be performed sequentially and/or in parallel) to obtain the data described by the one or more data attributes (e.g., using data dependencies associated with data inputs and/or data sources).

As shown by reference number 250, the orchestrator 205 may obtain, from the data access layer 215 and/or or more data sources 220, data to be used to determine an outcome of the rule set. For example, the orchestrator 205 may obtain data, features, and/or models to be used to determine the outcome of the rule set (e.g., based on the orchestrator 205 performing the flow for obtaining the data for the rule set). As described in more detail elsewhere herein, the decisioning platform 200 may be associated with a single data layer (e.g., the data access layer 215). In other words, a common data layer may be used to integrate with data systems of the entity. This enables a decision to be configured (e.g., via the rule set) in the context of the data available without requiring deep knowledge of the technologies and data schemas associated with the data sources 220. For example, the rule set may be defined using one or more data attributes from a common data layer (e.g., the data access layer 215). This reduces a complexity associated with defining the rules by using a metadata driven interface where rules can be defined using data attributes that describe the data to be used to determine the outcome of the rules.

The orchestrator 205 may determine an outcome of the rule set based on the obtained data. For example, the orchestrator 205 may apply one or more rules (e.g., included in the rule set) to the obtained data to determine the outcome. In some implementations, as shown by reference number 255, the orchestrator 205 may cause an indication of the outcome to be provided via the one or more client channels 235. The one or more client channels 235 may be associated with communication channels (e.g., email, phone, text message, or other communication channels). The orchestrator 205 may cause an indication of the outcome to be provided, via the one or more client channels 235, to a user that is associated with the outcome. For example, the outcome may be associated with an account and the orchestrator 205 may cause an indication of the outcome to be provided, via the one or more client channels 235, to a user that is associated with the account.

As shown by reference number 260, the orchestrator 205 may cause an indication of the outcome to be provided to the fulfillment orchestrator 225. The fulfillment orchestrator 225 may cause one or more actions to be performed based on the outcome. For example, the fulfillment orchestrator 225 may cause the one or more fulfillment systems 230 to perform an action where the action is based on the outcome.

As a result, the decisioning platform 200 may use a metadata driven interface that automatically presents data, models, and features that can be applied to rules and decision flows to a user (e.g., via the rules engine 210). Additionally, the decisioning platform 200 may use a common data layer to integrate with data systems across an entity. Further, the decisioning platform may enable users to author a decision (e.g., create a rule set) in the context of the data available without requiring deep knowledge of the technologies and data schemas (e.g., by enabling the rules to be defined using one or more data attributes). This provides a simple way to define rules through a metadata driven interface (e.g., in a Rules-as-Data approach) as well as configuring the desired outcome of a rule set. Additionally, the orchestrator 205 may encode the provided rules and decision flow logic into configurations (e.g., the configuration file described elsewhere herein) that are interpreted by the decision execution runtime environment with zero coding provided by a user and without tight coupling to any specific underlying components or backends.

As indicated above, FIG. 2 is provided as an example. Other examples may differ from what is described with regard to FIG. 2. The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single components shown in FIG. 2 may be implemented as multiple, distributed components. Additionally, or alternatively, a set of components (e.g., one or more components) shown in FIG. 2 may perform one or more functions described as being performed by another set of components shown in FIG. 2.

Figure 3:
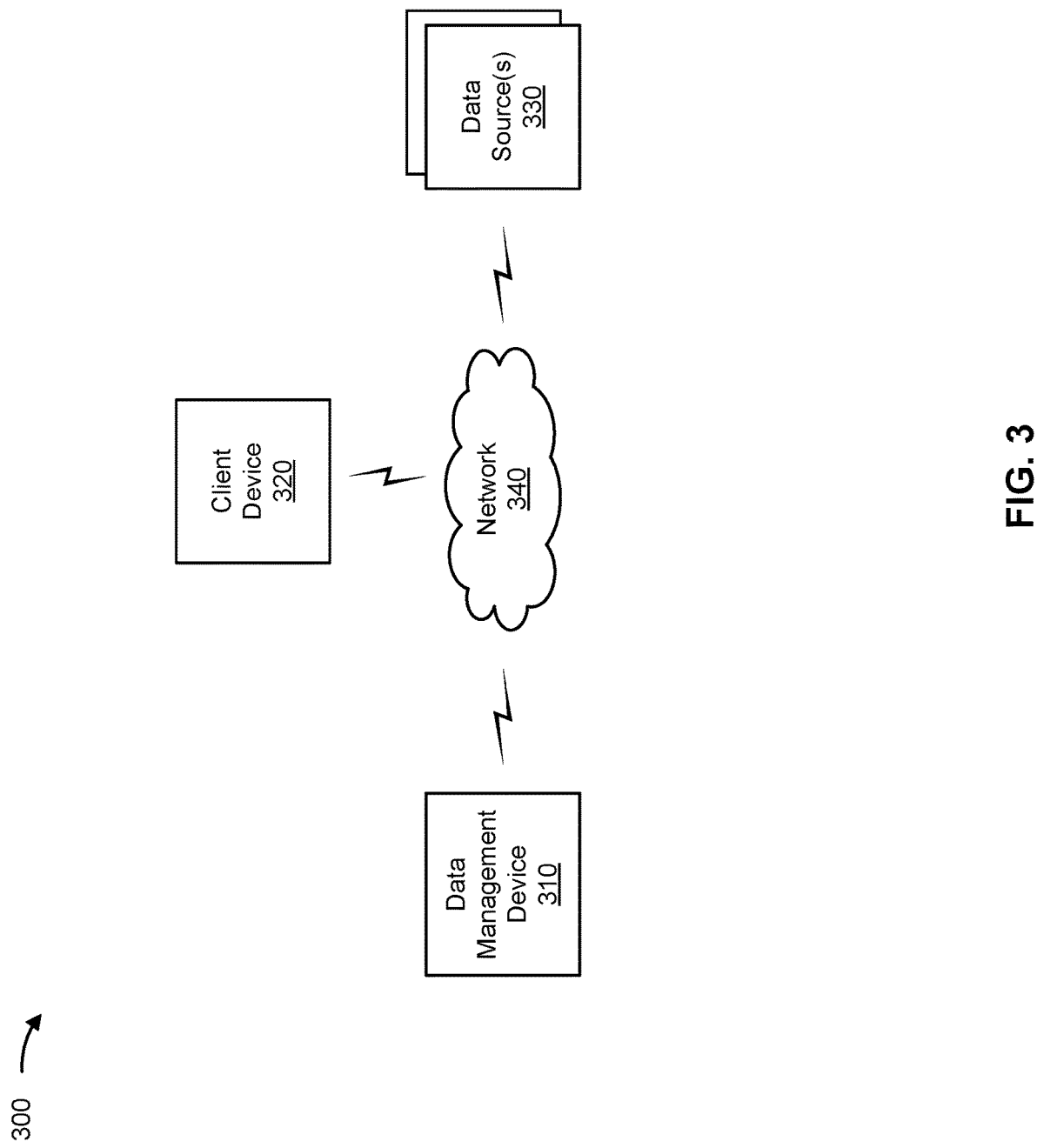
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include a data management device 310, a client device 320, one or more data sources 330, and a network 340. Devices of environment 300 may interconnect via wired connections, wireless connections, or a combination of wired and wireless connections.

The data management device 310 may include one or more devices capable of receiving, generating, storing, processing, providing, and/or routing information associated with data attribute dependent rules and data orchestration, as described elsewhere herein. The data management device 310 may include a communication device and/or a computing device. For example, the data management device 310 may include a server, such as an application server, a client server, a web server, a database server, a host server, a proxy server, a virtual server (e.g., executing on computing hardware), or a server in a cloud computing system. In some implementations, the data management device 310 may include computing hardware used in a cloud computing environment. In some implementations, the data management device 310 may include one or more components depicted and described in connection with FIG. 2, such as the orchestrator 205, the rules engine 210, the data access layer 215, the fulfillment orchestrator 225, and/or the one or more fulfillment systems 230, among other examples.

The client device 320 may include one or more devices capable of receiving, generating, storing, processing, and/or providing information associated with data attribute dependent rules and data orchestration, as described elsewhere herein. The client device 320 may include a communication device and/or a computing device. For example, the client device 320 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

A data source 330 may include one or more devices capable of receiving, generating, storing, processing, and/or providing information associated with data attribute dependent rules and data orchestration, as described elsewhere herein. The data source 330 may include a communication device and/or a computing device. For example, the data source 330 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data source 330 may communicate with one or more other devices of environment 300, as described elsewhere herein. In some implementations, the one or more data sources 330 may include the one or more data sources 220.

The network 340 may include one or more wired and/or wireless networks. For example, the network 340 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 340 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
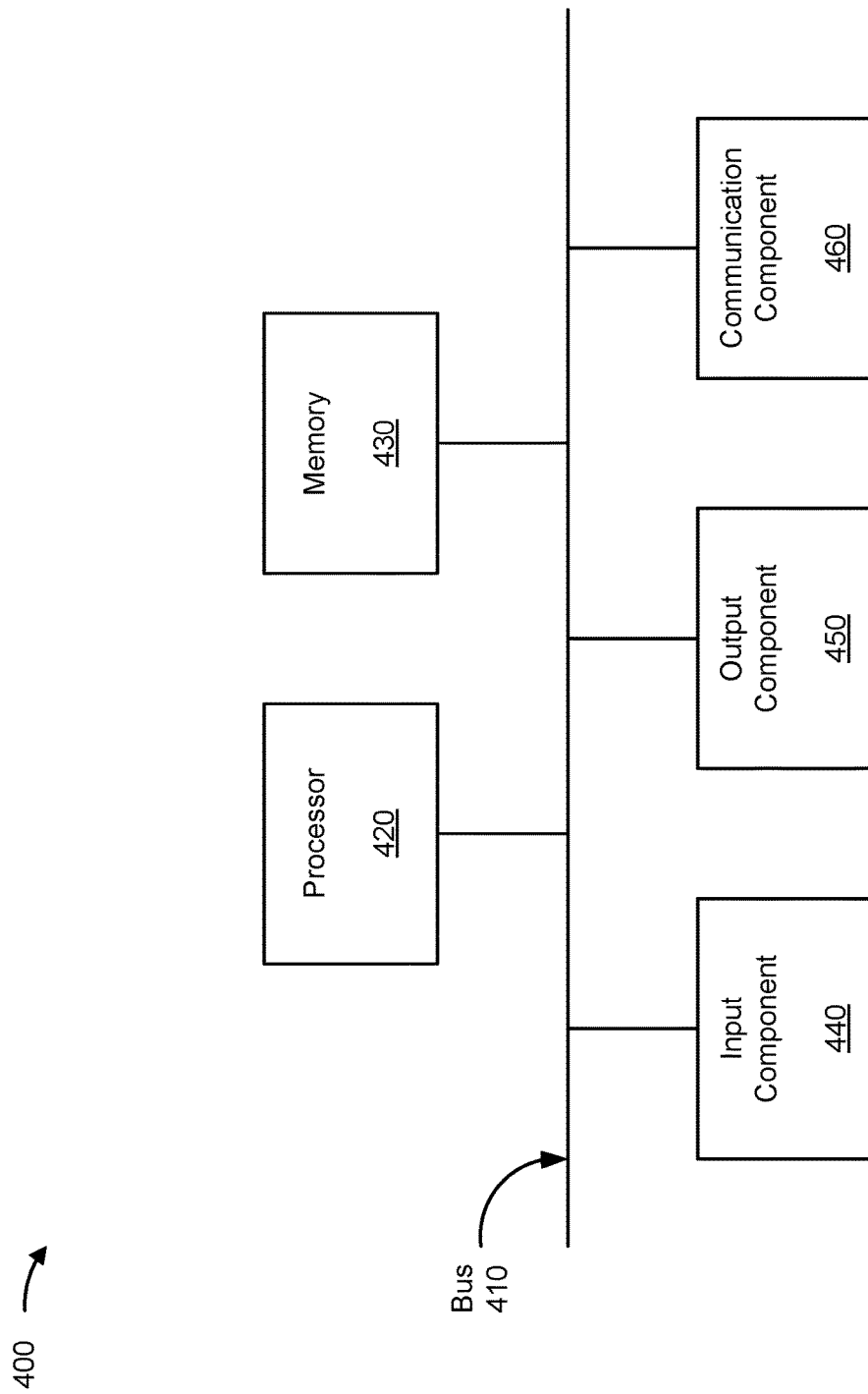
FIG. 4 is a diagram of example components of a device associated with data attribute dependent rules and data orchestration, in accordance with some embodiments of the present disclosure.

FIG. 4 is a diagram of example components of a device 400 associated with data attribute dependent rules and data orchestration. The device 400 may correspond to the data management device 310, the client device 320, and/or a data source 330. In some implementations, the data management device 310, the client device 320, and/or a data source 330 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
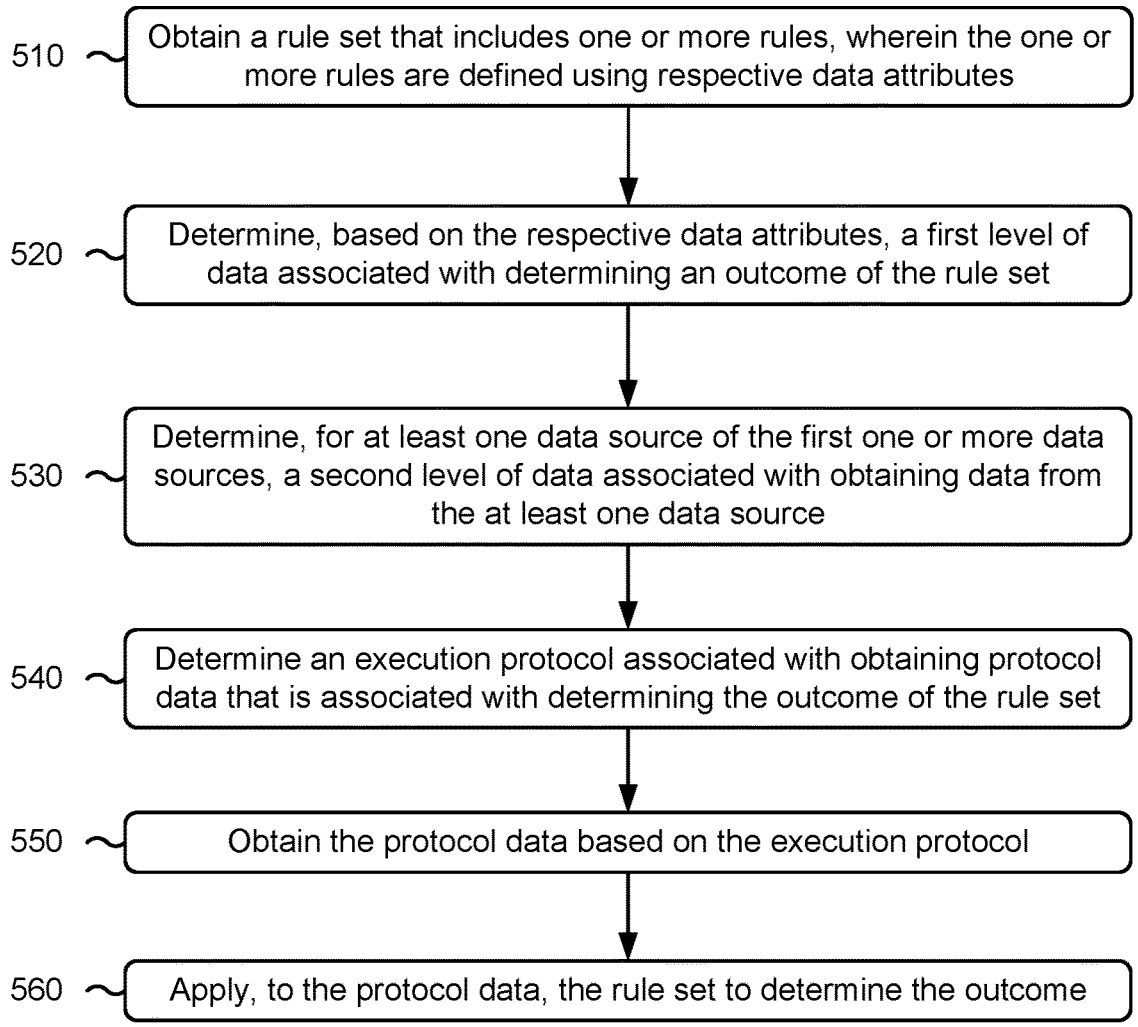
FIG. 5 is a flowchart of an example process associated with data attribute dependent rules and data orchestration, in accordance with some embodiments of the present disclosure.

FIG. 5 is a flowchart of an example process 500 associated with data attribute dependent rules and data orchestration. In some implementations, one or more process blocks of FIG. 5 may be performed by the data management device 310. In some implementations, one or more process blocks of FIG. 5 may be performed by another device or a group of devices separate from or including the data management device 310, such as the client device 320 and/or one or more data sources 330. Additionally, or alternatively, one or more process blocks of FIG. 5 may be performed by one or more components of the device 400, such as processor 420, memory 430, input component 440, output component 450, and/or communication component 460. Additionally, or alternatively, one or more process blocks of FIG. 5 may be performed by one or more components of the decisioning platform 200, such as the orchestrator 205, the rules engine 210, the data access layer 215, the one or more data sources 220, the fulfillment orchestrator 225, the one or more fulfillment systems 230, and/or the one or more client channels 235.

As shown in FIG. 5, process 500 may include obtaining a rule set that includes one or more rules, wherein the one or more rules are defined using respective data attributes (block 510). For example, the data management device 310

(e.g., using processor 420 and/or memory 430) may obtain a rule set that includes one or more rules, wherein the one or more rules are defined using respective data attributes, as described above in connection with reference number 120 of FIG. 1A. As an example, a data attribute may describe data that is stored via a common data layer of a decisioning platform, such as the decisioning platform 200. For example, a data attribute may be a descriptor for a data point or a data object.

As further shown in FIG. 5, process 500 may include determining, based on the respective data attributes, a first level of data associated with determining an outcome of the rule set (block 520). For example, the data management device 310 (e.g., using processor 420 and/or memory 430) may determine, based on the respective data attributes, a first level of data associated with determining an outcome of the rule set, as described above in connection with reference number 130 of FIG. 1B. In some implementations, the first level of data is associated with a first one or more data sources. As an example, the first level of data may include data sources that provide data that is to directly be used to determine an outcome of the rule set.

As further shown in FIG. 5, process 500 may include determining, for at least one data source of the first one or more data sources, a second level of data associated with obtaining data from the at least one data source (block 530). For example, the data management device 310 (e.g., using processor 420 and/or memory 430) may determine, for at least one data source of the first one or more data sources, a second level of data associated with obtaining data from the at least one data source, as described above in connection with reference number 135 of FIG. 1B. In some implementations, the second level of data is associated with a second one or more data sources. In some implementations, the second one or more data sources are determined based on one or more data attributes of the at least one data source. As an example, the second level of data may include data sources that provide data to be used to generate, determine, and/or obtain data from data source(s) included in the first level of data.

As further shown in FIG. 5, process 500 may include determining an execution protocol associated with obtaining protocol data that is associated with determining the outcome of the rule set (block 540). For example, the data management device 310 (e.g., using processor 420 and/or memory 430) may determine an execution protocol associated with obtaining protocol data that is associated with determining the outcome of the rule set, as described above in connection with reference number 140 of FIG. 1D. In some implementations, the execution protocol is associated with an order that is based on one or more data dependencies between the first level of data and the second level of data. As an example, the order may be a workflow associated with obtaining data described by the one or more data attributes.

As further shown in FIG. 5, process 500 may include obtaining the protocol data based on the execution protocol (block 550). For example, the data management device 310 (e.g., using processor 420 and/or memory 430) may obtain the protocol data based on the execution protocol, as described above in connection with reference number 175 of FIG. 1F. As an example, the data management device 310 may obtain the protocol data in the order that is based on one or more data dependencies between the first level of data and the second level of data.

As further shown in FIG. 5, process 500 may include applying, to the protocol data, the rule set to determine the outcome (block 560). For example, the data management device 310 (e.g., using processor 420 and/or memory 430) may apply, to the protocol data, the rule set to determine the outcome, as described above in connection with reference number 180 of FIG. 1G. As an example, the data management device 310 may determine the outcome based on the obtained protocol data. The data management device 310 may perform one or more actions based on the outcome, as described in more detail elsewhere herein.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1G and/or FIG. 2. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for data attribute dependent rules and data orchestration, the system comprising:
   one or more memories; and
   one or more processors, communicatively coupled to the one or more memories, configured to:
   obtain a rule set that includes one or more rules, wherein the rule set is associated with a protocol, and wherein the one or more rules are defined using one or more data attributes;
   determine, based on the one or more data attributes, one or more data inputs associated with executing the protocol;
   determine, for each data input of the one or more data inputs, one or more data sources associated with obtaining each data input,
      wherein the one or more data sources are based on the one or more data attributes and each data input,
      wherein the one or more data sources includes at least one dependent data source, and
      wherein the system continues to determine one or more levels of data sources associated with obtaining data for each data input until no data sources are dependent on other data sources;
   obtain the one or more data inputs using protocol data from the one or more data sources, wherein the protocol data is obtained from a data set based on the one or more data sources;
   receive a request to test the rule set;
   determine, based on receiving the request, whether data is successfully obtained for the rule set;
   execute, based on determining whether the data is successfully obtained and using the one or more data inputs, the protocol to obtain a protocol output; and
   perform an action based on the protocol output.

2. The system of claim 1,
wherein the one or more processors, to determine the one or more data sources, are configured to:
   determine, for a data input of the one or more data inputs, a first data source of the one or more data sources based on a first data attribute associated with the data input,
      wherein the first data source is associated with obtaining the data input; and
   determine, for the first data source, a second data source of the one or more data sources based on a second data attribute associated with the first data source,
      wherein the second data source is associated with obtaining data for the first data source, and
      wherein the protocol data includes data from the first data source and from the second data source.

3. The system of claim 1,
wherein the at least one dependent data source uses another data source, from the one or more data sources, to obtain data.

4. The system of claim 1,
wherein the one or more processors are further configured to:
   determine a protocol flow, associated with the protocol, associated with obtaining the one or more data inputs,
      wherein the protocol flow defines one or more steps for obtaining data from the one or more data sources and for determining the one or more data inputs.

5. The system of claim 4,
wherein the one or more processors, to determine the protocol flow, are configured to:
   determine, for a step associated with obtaining a data input, a data dependency between two or more data sources based on the one or more data attributes and the data input,
      wherein the data dependency indicates that a first data source, from the two or more data sources, relies on data from a second data source of the two or more data sources; and
   determine at least one step of the one or more steps based on the data dependency to cause data to be obtained from the second data source before data is obtained from the first data source.

6. The system of claim 1,
wherein the one or more processors are further configured to:
   generate a configuration file for the protocol, wherein the configuration file defines one or more steps for obtaining data from the one or more data sources and for determining the one or more data inputs.

7. The system of claim 1, wherein the one or more data attributes define one or more types of data to be used to execute the protocol.

8. The system of claim 1, wherein the protocol output indicates a determination for a request associated with an account, and wherein the one or more processors, to perform the action, are configured to:
perform a modification of information associated with the account if the determination indicates that the request is approved.

9. A method for data attribute dependent rules and data orchestration, comprising:
obtaining, by a device, a rule set that includes one or more rules,
wherein the one or more rules are defined using respective data attributes;
determining, by the device and based on the respective data attributes, a first level of data associated with determining an outcome of the rule set,
wherein the first level of data is associated with a first one or more data sources;
determining, by the device and for at least one data source of the first one or more data sources, a second level of data associated with obtaining data from the at least one data source,
wherein the second level of data is associated with a second one or more data sources,
wherein the second one or more data sources are determined based on one or more data attributes of the at least one data source, and
wherein the device continues to determine additional levels of data associated with obtaining data from the at least one data source until all data sources in a last level are independent data sources;
determining, by the device, an execution protocol associated with obtaining protocol data that is associated with determining the outcome of the rule set,
wherein the execution protocol is associated with an order that is based on one or more data dependencies between the first level of data and the second level of data;
receiving, by the device, a request to test the rule set;
determining, by the device and based on receiving the request, whether data is successfully obtained for the rule set;
obtaining, by the device and based on determining whether the data is successfully obtained, the protocol data based on the execution protocol; and
applying, by the device and to the protocol data, the rule set to determine the outcome.

10. The method of claim 9, wherein determining the execution protocol comprises:
determining, for a first data source of the first one or more data sources, a second data source of the second one or more data sources based on a data attribute associated with the first data source indicating a data dependency with the second data source,
wherein the second data source is associated with first data that is used to obtain second data from the first data source; and
determining, based on the data dependency, the execution protocol to obtain the first data before obtaining the second data.

11. The method of claim 9, further comprising:
providing, for display, a user interface that includes one or more user input options associated with defining data attributes for rules, and
wherein obtaining the rule set comprises:
obtaining the rule set based on one or more user inputs to the user interface.

12. The method of claim 9, wherein the execution protocol defines one or more steps for obtaining data from the first one or more data sources and the second one or more data sources.

13. The method of claim 9, further comprising:
generating a configuration file for the rule set, wherein the configuration file defines the order.

14. The method of claim 9, wherein the one or more data attributes define one or more types of data to be used to determine the outcome.

15. The method of claim 9, further comprising:
performing an action that is indicated by the outcome.

16. A non-transitory computer-readable medium storing a set of instructions, the set of instructions comprising:
one or more instructions that, when executed by one or more processors of a device, cause the device to:
obtain a rule set that includes one or more rules,
wherein the one or more rules are defined using respective data attributes;
determine, based on the respective data attributes, a first level of data associated with determining an outcome of the rule set,
wherein the first level of data is associated with a first one or more data sources;
determine, for at least one data source of the first one or more data sources, a second level of data associated with obtaining data from the at least one data source,
wherein the second level of data is associated with a second one or more data sources,
wherein the second one or more data sources are determined based on one or more data attributes of the at least one data source, and
wherein the device continues to determine additional levels of data associated with obtaining data from the at least one data source until all data sources in a last level are independent data sources;
determine an execution protocol associated with obtaining protocol data that is associated with determining the outcome of the rule set,
wherein the execution protocol is associated with an order that is based on one or more data dependencies between the first level of data and the second level of data;
generate a configuration file for the execution protocol, wherein the configuration file defines the order; and
execute the configuration file based on receiving a request to test the rule set.

17. The non-transitory computer-readable medium of claim 16, wherein the one or more instructions further cause the device to:
obtain, based on executing the configuration file, the protocol data; and
apply, to the protocol data, the one or more rules to determine the outcome.

18. The non-transitory computer-readable medium of claim 16, wherein the one or more instructions, that cause the device to determine the execution protocol, cause the device to:
  determine, for a first data source of the first one or more data sources, a second data source of the second one or more data sources based on a data attribute associated with the first data source indicating a data dependency with the second data source,
    wherein the second data source is associated with first data that is used to obtain second data from the first data source; and
  determine, based on the data dependency, the execution protocol to obtain the first data before obtaining the second data.

19. The non-transitory computer-readable medium of claim 16,
  wherein the one or more instructions further cause the device to:
    provide, for display, a user interface that includes one or more user input options associated with defining data attributes for rules.

20. The non-transitory computer-readable medium of claim 16,
  wherein the order defines one or more steps for obtaining data from the first one or more data sources and the second one or more data sources.

* * * * *